Oct. 18, 1966   B. E. THOUVENELLE ETAL   3,279,823
PNEUMATIC CONNECTION MEANS FOR A LAND VEHICLE
Filed Oct. 20, 1964
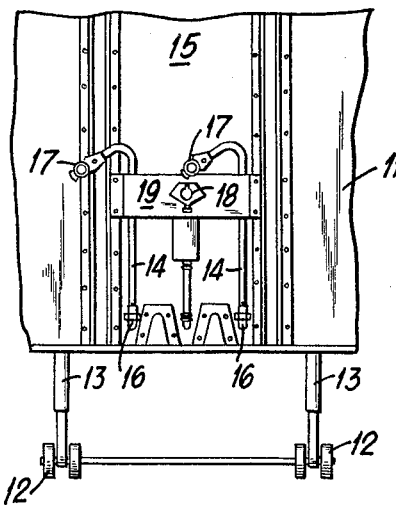
FIG.1
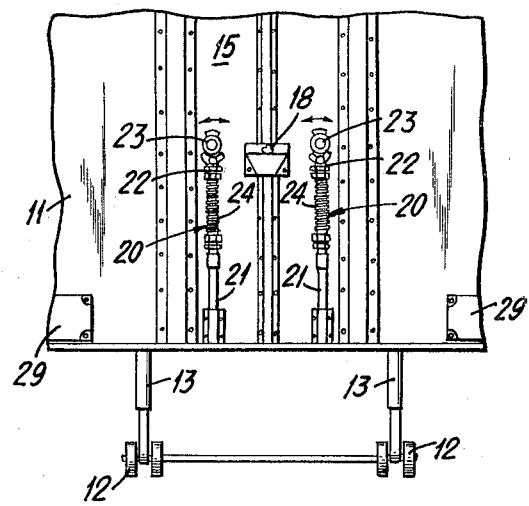
FIG.2
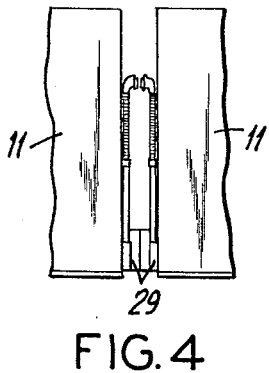
FIG.4
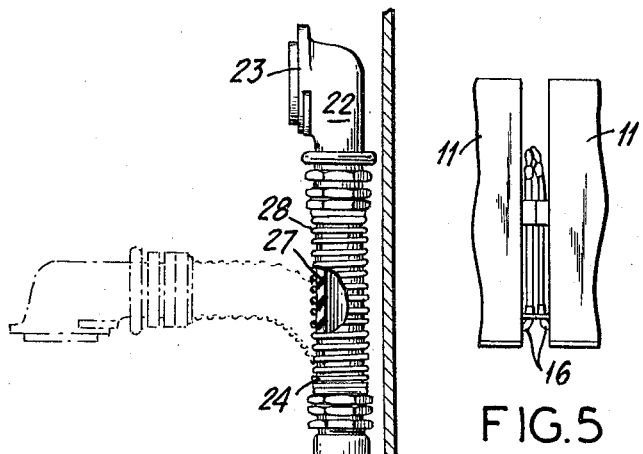
FIG.5
FIG.3
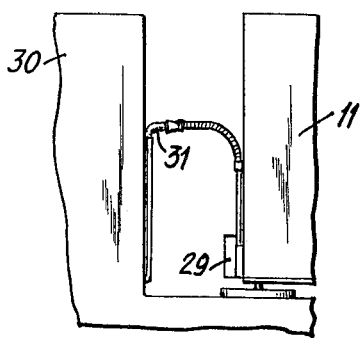
FIG.6
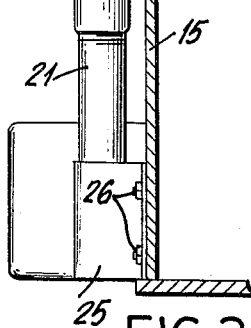
INVENTORS
BERYL E. THOUVENELLE
WILLIAM H. STRINGER
BY  C. GORDON ANDERSON
J. Walton Bader
ATTORNEY

United States Patent Office 3,279,823
Patented Oct. 18, 1966

3,279,823
PNEUMATIC CONNECTION MEANS FOR A
LAND VEHICLE
Beryl E. Thouvenelle, 4005 San Amaro Drive, Coral
Gables, Fla., William H. Stringer, 2556 Stein St., Jacksonville, Fla., and C Gordon Anderson, 1415 Sevilla
Ave., Coral Gables, Fla.
Filed Oct. 20, 1964, Ser. No. 405,044
1 Claim. (Cl. 280—421)

This invention relates to pneumatic connection means for a land vehicle and is particularly advantageous when applied to truck trailers which are stored under crowded conditions or which are transported upon auxiliary vehicles such as ships.

The structure of the instant invention is also utilizable in connection with the method of handling truck trailers which is disclosed and claimed in our co-pending application Serial No. 405,130 filed October 20, 1964.

In placing truck trailers in position under crowded conditions where space is at a premium such as, for example, upon specially constructed ships or in crowded yards, an end of one trailer may abut an end of another trailer. Obviously if the trailers are separated from one another at any distance the space utilization is correspondingly reduced.

In the conventional truck trailer means must be provided for pneumatically connecting the brakes of the trailer with an air supply of the tractor. These means must be demountable since the tractor is disconnected from the trailer when the trailer is stored or transported on auxiliary vehicles. Since it is necessary to prevent strain upon the demountable connecting means between the tractor and trailer when the trailer is pulled by the tractor conventionally the connecting conduits are formed with an outwardly projecting angular bend.

Also, in this operation, it is necessary to rigidly support one portion of the trailer conduit to the trailer. It is also necessary that the coupling portion of the conduit be likewise rigid. As a result the forward end of trailers conventionally bear an angled rigid conduit or, in the preferred operation, a pair of spaced rigid conduits.

In storing these trailers in cramped quarters an end of one trailer sometimes abuts an end of another trailer. In conventional trailers this causes the conduits to become bent out of shape and renders the trailer useless for over-the-road operation until repaired.

The use of completely flexible conduits is not practical since they cannot be properly attached to the body of the trailer and furthermore cannot bear proper coupling portions thereupon.

The instant invention therefore provides means to obviate the difficulties encountered. The conduit secured to the trailer comprises a rigid lower section which is secured thereto. A rigid upper section is likewise provided bearing coupling means thereupon and a flexible intermediate section is disposed between the upper and lower sections. In the preferred modification of this invention the intermediate section causes the conduit to lie alongside the side of the trailer while, in operation, the flexible intermediate section assumes the proper forwardly projecting angular bend.

Also, in the preferred modification of this invention, forwardly projecting bumper means are provided upon the side of the trailer carrying the conduit means. The conduit means are normally disposed, when the trailer is in rest position and the tractor disconnected, within the line of the bumper means.

The foregoing constitutes a brief description of the instant invention and the objects and advantages thereof.

The invention will be further described by reference to the accompanying drawings which are made a part of this specification.

FIG. 1 is a front elevational view of a conventional truck trailer showing the manner in which the conduit members may be damaged by impingement of another trailer against said conduits.

FIG. 2 is a front view of a truck trailer similar to that of FIG. 1 but showing the conduit members of this invention installed thereupon.

FIG. 3 is an enlarged side elevational view, partly in section, showing the details of construction of one of the conduit members of this invention with the position that the conduit member assumes upon the truck trailer being pulled by a conventional tractor indicated in phantom lines.

FIG. 4 is a fragmentary side elevational view showing the manner in which the truck trailers fitted with the conduit members of this invention may be placed in abutting relationship without damage to the conduit members.

FIG. 5 is a view similar to that of FIG. 4 but with conventional conduit members shown and illustrating the manner in which the conduit members are damaged by truck trailers so equipped being placed in abutting relationship.

FIG. 6 is a diagrammatic view showing the position that the conduit members of this invention assume upon the trailer being pulled by a tractor.

The invention will now be described by reference to the accompanying drawings which represent the best mode known to the inventors of taking advantage of their invention. In this connection, however, the reader is informed that the specific form of this invention shown in the accompanying drawings is merely for illustrative purposes and for purposes of example only. Various changes and modifications may obviously be made within the spirit and scope of this invention and would occur to those skilled in this art.

Referring to the drawings in detail a conventional truck trailer 11 is formed with a pair of retractable front wheels 12 secured to a support 13 which in turn is secured to trailer 11. Trailer 11 also bears the conventional rear driving wheels and a kingpin at the front end thereof which are not shown. In FIGS. 1 and 5 the conventional conduit members 14 are illustrated which are formed of rigid pipe and are secured to a side 15 of trailer 11 by means of holding members 16. A coupling member 17 is secured to each of conduits 14. Between conduits 14 the conventional electrical connector box 18 is provided which is secured in position by support 19.

In FIGS. 2, 3, 4 and 6 the truck trailer made in accordance with this invention is shown. Front end 15 of trailer 11 bears a plurality of conduits 20. Each of conduits 20 are formed with a rigid lower section 21, a rigid upper section 22 bearing coupling means 23 and a flexible and resilient intermediate section 24. Section 21 of each of conduits 20 is secured to side 15 of trailer 11 by bracket 25 which in turn is bolted to side 15 by bolts 26. The coupling means 23 are the conventional "quick connect and disconnect" means which are utilized on conventional truck trailers such as the Fruehauf trailer.

Intermediate section 24 of each of conduits 20 is formed with a flexible and resilient interior portion 27 (preferably made of rubber) and an outer spring portion 28. Section 22 is formed with a threaded portion which is connected to a mating threaded portion provided upon section 24 while section 21 also bears a threaded portion which is connected to a mating threaded portion upon section 24. Thus section 24, which in time may lose its resiliency, can be quickly and easily replaced.

Bumpers 29 are disposed upon end 15 of trailer 11 and project therefrom. In the normal disconnected position each of conduits 20 lie within the line of bumpers 29.

With the foregoing specific description the operation of this invention may now be explained.

In the normal rest disconnected position conduits 20 assume the positions shown in FIGS. 2 and 4. An end portion 15 of one trailer can thus be abutted with an end portion 15 of another trailer since bumpers 29 will abut and corresponding portions 22 of conduits 20 will not abut. In operation coupling 23 is engaged with a conventional coupling which is secured to a tractor 30 having a conventional "fifth wheel" (not shown) which is secured to the kingpin of the trailer. As the tractor pulls the trailer each of conduits 20 form a forwardly projecting angular bend by the bending of intermediate portion 24 as shown clearly in FIG. 6. The bend angle will depend upon the starting and stopping of the towing tractor and prevents the coupling members from being pulled apart. When the tractor is placed in a position wherein it is to be stored in a yard or transported upon an auxiliary vehicle tractor 30 is disengaged and tractor coupling member 31 disengaged from coupling 23. Conduit 20 then springs to upright position as shown in FIGS. 2 and 4.

The foregoing indicates the manner in which the objects of this invention are achieved.

We claim:

A truck trailer comprising a body having a pair of opposite end portions, wheel means disposed beneath said body, a projecting resilient bumper upon an end portion of said body, a pair of spaced conduit members normally lying alongside said end portion and within the line of said bumper, each of said conduit members including a rigid lower section secured to said vehicle, a rigid upper section free of said vehicle carrying coupling means thereupon, and a flexible resilient intermediate section, said intermediate section assuming an angular bend when said trailer is towed, said bumper preventing damage to said conduit members when opposite end portions of different trailers abut one another.

References Cited by the Examiner
UNITED STATES PATENTS

| | | | |
|---|---|---|---|
| 2,185,741 | 1/1940 | Sorg et al. | 138—110 X |
| 2,288,108 | 6/1942 | Roll | 285—114 X |
| 2,540,203 | 2/1951 | Hatcher | 280—421 X |
| 2,730,377 | 1/1956 | Fuschi | 280—421 X |
| 2,894,536 | 7/1959 | Arnot | 285—114 |

LEO FRIAGLIA, *Primary Examiner.*